(12) United States Patent
Cho et al.

(10) Patent No.: US 8,379,533 B2
(45) Date of Patent: Feb. 19, 2013

(54) UNIVERSAL PLUG AND PLAY METHOD AND APPARATUS TO PROVIDE REMOTE ACCESS SERVICE

(75) Inventors: Seong-ho Cho, Seoul (KR); Se-hee Han, Seoul (KR); Sang-hyeon Kim, Seoul (KR); Mahfuzur Rahman, San Jose, CA (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 631 days.

(21) Appl. No.: 12/585,082

(22) Filed: Sep. 2, 2009

(65) Prior Publication Data

US 2010/0111073 A1  May 6, 2010

Related U.S. Application Data

(63) Continuation-in-part of application No. 12/318,962, filed on Jan. 13, 2009.

(60) Provisional application No. 61/021,191, filed on Jan. 15, 2008.

(30) Foreign Application Priority Data

Aug. 12, 2008 (KR) .................. 10-2008-0079037

(51) Int. Cl.
*G08C 15/00* (2006.01)
(52) U.S. Cl. ..................... 370/252; 715/239
(58) Field of Classification Search .......... None
See application file for complete search history.

(56) References Cited

U.S. PATENT DOCUMENTS

| | | | |
|---|---|---|---|
| 2005/0010638 A1 * | 1/2005 | Richardson et al. | 709/204 |
| 2006/0245403 A1 | 11/2006 | Kumar | |
| 2007/0043829 A1 | 2/2007 | Dua | |
| 2007/0076729 A1 | 4/2007 | Takeda | |
| 2007/0203979 A1 | 8/2007 | Walker et al. | |
| 2007/0276925 A1 | 11/2007 | La Joie et al. | |
| 2008/0002709 A1 * | 1/2008 | Kennedy et al. | 370/395.1 |
| 2008/0256232 A1 | 10/2008 | Fleury et al. | |
| 2010/0191829 A1 * | 7/2010 | Cagenius | 709/219 |

FOREIGN PATENT DOCUMENTS

| | | |
|---|---|---|
| CN | 101076993 A | 11/2007 |
| KR | 10-2007-0018196 | 2/2007 |
| KR | 10-2009-0078716 | 7/2009 |

OTHER PUBLICATIONS

Rosenberg et al. IETF RFC 3261, Jun. 2002, p. 1 and 11.*
Spartks et al. IETF RFC 3265, Jun. 2002, pp. 1, 16 and 24.*
J. Rosenberg et al., "Traversal Using Relay NAT (TURN)", MIDCOM, Internet Draft of the Internet Society, Sep. 2005, pp. 1-40.

(Continued)

*Primary Examiner* — Jianye Wu
(74) *Attorney, Agent, or Firm* — Staas & Halsey LLP

(57) ABSTRACT

Provided are a universal plug and play (UPnP) method and an apparatus thereof to provide remote access service, where the method includes receiving external inputs of an identifier of a remote access server (RAS) to generate a credential and a session initiation protocol (SIP) identifier of the RAS, generating a payload of a SIP packet written in extensible markup language (XML), which includes a credential ID generated based on the identifier of the RAS and remote access transport agent (RATA) capability information, and transmitting the SIP packet to the RAS identified by the SIP identifier, where the payload of the SIP packet includes multipurpose internet mail extensions (MIME)-type information to be identified as information used to provide remote access service.

21 Claims, 9 Drawing Sheets

OTHER PUBLICATIONS

Petros Belimpasakis et al., "Remote Access to Universal Plug and Play (UPnP) Devices Utilizing the Atom Publishing Protocol", Third International Conference on Networking and Services, 2007, pp. 1-6.

Jung-Tae Kim et al., "Implementation of the DLNA Proxy System for Sharing Home Media Contents", IEEE, 2007, pp. 139-144.

J. Rosenberg, "Interactive Connectivity Establishment (ICE): A Protocol for Network Address Translator (NAT) Traversal for Offer/Answer Protocols", The IETF Trust Internet Draft, 2007, pp. 1-120.

J. Rosenberg, "Session Traversal Utilities for (NAT) (STUN)", The IETF Trust BEHAVE Working Group Internet Draft, 2008, pp. 1-49.

J. Rosenberg, "Transversal Using Relays around NAT (TURN): Relay Extensions to Session Traversal Utilities for NAT (STUN)", The IETF Trust BEHAVE Internet Draft, 2008, pp. 1-40.

Andreas Müller et al., "On the Applicability of Knowledge Based NAT-Traversal for Home Networks", Networking, 2008, pp. 264-275.

Extended European Search Report dated Dec. 23, 2011 issued in corresponding European Patent Application No. 09702451.7.

U.S. Appl. No. 12/318,962, filed Jan. 13, 2009, Seong-ho Cho, et al., Samsung Electronics Co., Ltd.

Office Action, mailed Apr. 19, 2012, in corresponding U.S. Appl. No. 12/318,962 (20 pp.).

Rosenburg, J. et al., SIP: Session Initiation Protocol, Network Working Group, Standards Track, Jun. 2002, pp. 1 and 11.

International Search Report for corresponding International Application PCT/KR2009/000225; dated Aug. 17, 2009.

U.S. Notice of Allowance mailed Aug. 16, 2012 in related U.S. Appl. No. 12/318,962.

Chinese Office Action issued Sep. 13, 2012 in corresponding Chinese Patent Application 200980108217.1.

* cited by examiner

FIG. 2A

PACKET HEADER FIELD
INVITE
sip:UAB@example.com
SIP/2.0
Via:SIP/2.0/UDP 10.20.30.40:5060
From:User A <sip:UAA@example.com>;tag=589304
To:myHome <sip:UAB@example.com>
Call-ID:8204589102@example.com
CSeq:1 INVITE
Contact:<sip:UserA@10.20.30.40>
Content-Type:application/sdp
Content-Length:141

PAYLOAD
v=0
O=UserA 2890844526 2890844526 IN IP4 10.20.30.40
s=Session SDP
c=IN IP4 10.20.30.40
t=3034423619 0
m=application 32416 udp/ipsec-esp wb
a=...<<rata capability info here>>...    — 213

RAC (220)

SIP INVITE PACKET (211) →
← RESPONSE PACKET (212)

RAS (225)

PACKET HEADER FIELD
SIP/2.0
200 OK
From:UserA <sip:UAA@example.com>;tag=589304
To:myHome <sip:UAB@example.com>;tag=314159
Call-ID:8204589102@example.com
CSeq:1 INVITE
Contact:<sip:UserB@10.20.30.41>
Content-Type:application/sdp
Content-Length:140

PAYLOAD
v=0
O=UserB 2890844527 2890844527 IN IP4 10.20.30.41
s=Session SDP
c=IN IP4 10.20.30.41
t=3034423619 0
m=application 32011 udp/ipsec-esp wb
a=...<<matched profile here>>...    — 214

FIG. 2B

PACKET HEADER FIELD (231)

...

Accept: application/rata-provision-para+xml (232)
Content-Type: multipart/mixed (233)

...

PAYLOAD (234)

Session Description Protocol (SDP) Body-1 (235)
Content-Type: application/sdp (236)

Remote Access Provisioning Body-2 (237)
Content-Type: application/rata-provision-para+xml (238)

SIP INVITE PACKET /SIP RESPONSE PACKET (230)

FIG. 2C

```
INVITE
 <relevant sip headers>
 Accept: application/rata-provision-para+xml —242
 Content-Type: multipart/mixed; boundary=unique-boundary —243

--unique-boundary

Content-Type: application/sdp —244
  Content-Length: appropriate size
  v=0
  o=UserA 2890844526 2890844526 IN IP4 example.com
  s=Session SDP
  c=IN IP4 pc33.example.com
  t=0 0
  m=audio 49172 RTP/AVP 0
  a=rtpmap:0 PCMU/8000

--unique-boundary

Content-Type: application/rata-provision-para+xml; —245
Content-Length: appropriate size
<?xml version="1.0" encoding="UTF-8"?>
<rata-provision-para xmlns="urn:ietf:params:xml:ns:rata-provision-para">
       <provision-parameter>
           <............../>
           <............../>
           <............../>
       </provision-parameter>
</rata-provision-para>

--unique-boundary--
```

SIP INVITE PACKET / SIP RESPONSE PACKET (250)

FIG. 2E

```
INVITE
<relevant sip headers>
 Accept: application/pkcs7-mime   — 262
 Content-Type: multipart/mixed; boundary=unique-boundary   — 263

--unique-boundary-1

Content-Type: application/sdp   — 264
  Content-Length: appropriate size
  v=0
  o=UserA 2890844526 2890844526 IN IP4 example.com
  s=Session SDP
  c=IN IP4 pc33.example.com
  t=0 0
  m=audio 49172 RTP/AVP 0
  a=rtpmap:0 PCMU/8000

--unique-boundary

Content-Type: application/pkcs7-mime; smime-type=enveloped-data; name=smime.p7m   — 265
Content-Disposition: attachment; filename=smime.p7m handling=required
Content-Length: appropriate size
 ┌─────────────────────────────────────────────────────────────┐
 │ s-mime enveloped data                                        │
 │ <?xml version="1.0" encoding="UTF-8"?>                       │
 │   <rata-provision-para xmlns="urn:ietf:params:xml:ns:rata-provision-para">
 │     <provision-parameter>                                    │
 │        <............/>                                       │  — 266
 │        <............/>                                       │
 │        <............/>                                       │
 │     </provision-parameter>                                   │
 │   </rata-provision-para>                                     │
 └─────────────────────────────────────────────────────────────┘
—unique-boundary—
```

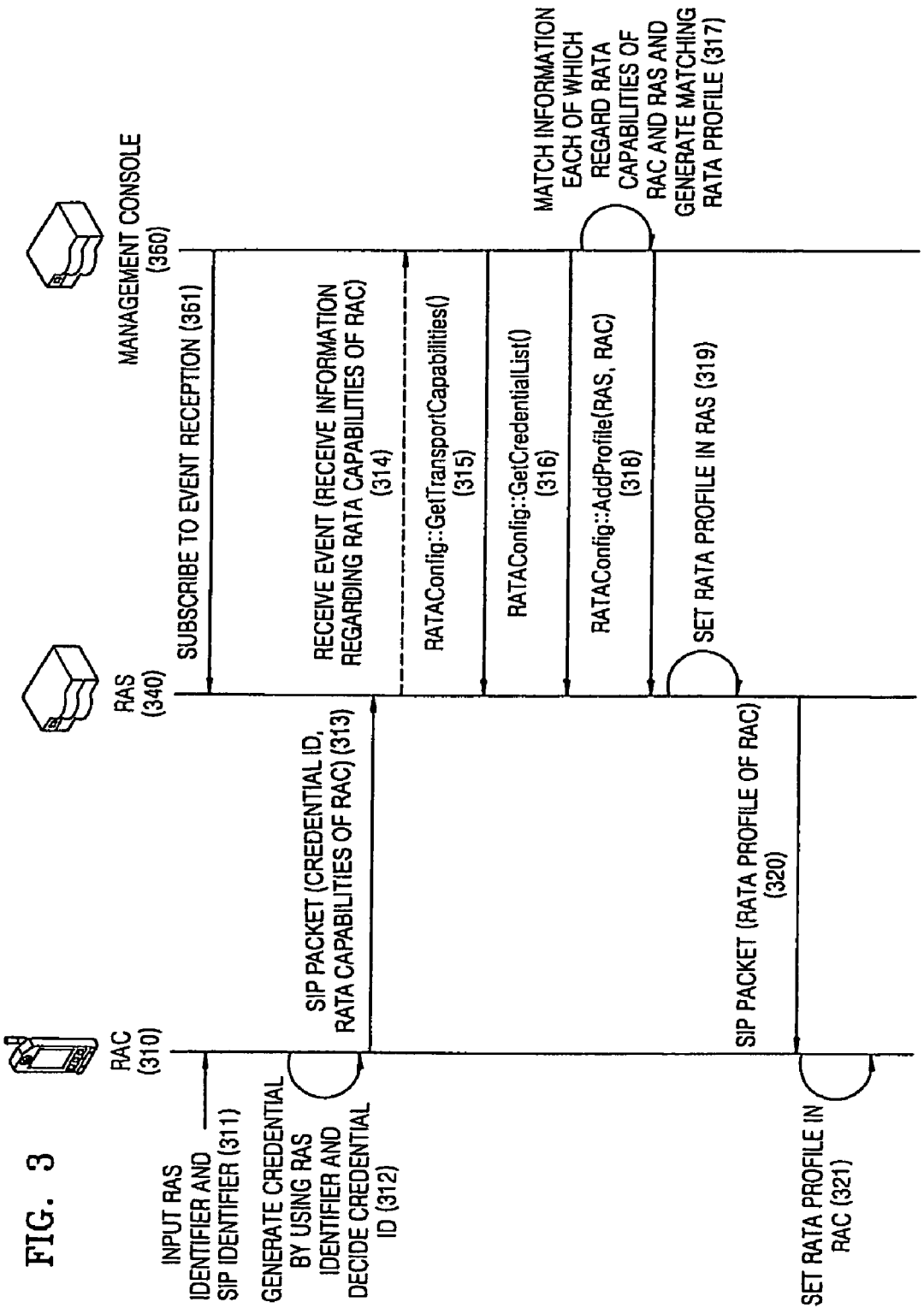

UNIVERSAL PLUG AND PLAY METHOD AND APPARATUS TO PROVIDE REMOTE ACCESS SERVICE

CROSS-REFERENCE TO RELATED APPLICATIONS

This application is a continuation-in part of U.S. patent application Ser. No. 12/318,962 filed on Jan. 13, 2009, which claims the benefit of U.S. Provisional Patent Application No. 61/021,191 filed on Jan. 15, 2008 in the U.S. Patent and Trademark Office, and the benefit of Korean Patent Application No. 10-2008-0079037 filed on Aug. 12, 2008, in the Korean Intellectual Property Office, the disclosures of which are incorporated herein by reference in their entirety.

BACKGROUND

1. Field

The present invention relates to a universal plug and play (UPnP) middleware-based home network, and more particularly, to a UPnP method and a UPnP apparatus to easily set channel setting information (RATA profile) and pass network address translation (NAT) to provide remote access service.

2. Description of the Related Art

Due to the spread of home networking, conventional home networking environments centering on personal computers (PC) are gradually shifting to home networking environments including electronic equipment using various lower networking technologies. As a result, home network middleware technologies such as universal plug and play (UPnP) are being developed to group such electronic equipment in a unified network by using Internet protocols (IP).

UPnP technology enables home appliances in a home network to be peer-to-peer networked on the basis of a distributed and open networking structure instead of being under centralized control.

Generally, in a home network middleware, a UPnP device models its service with actions and state variables. A UPnP control point automatically discovers the UPnP device to use the service.

The UPnP device architecture 1.0 uses the distributed and open networking to discover a UPnP device via an IP multicast in a home network. However, it cannot currently be guaranteed that IP multicast service is provided at the Internet level, and thus controlling a UPnP device using information obtained from the discovery of the UPnP device cannot be performed via the Internet.

As a result, UPnP Remote Access Architecture has been developed such that a UPnP device or a control point (CP) is operated in a home network as if they exist in the same network even if the UPnP device or the CP is physically outside the home network. The UPnP Remote Access Architecture defines a remote access server (RAS) existing within a home network and a remote access client (RAC) existing in a remote network.

SUMMARY

The present invention provides a UPnP method and a UPnP apparatus to easily set channel setting information (RATA profile) and pass network address translation (NAT) to provide remote access service.

Additional aspects and/or advantages will be set forth in part in the description which follows and, in part, will be apparent from the description, or may be learned by practice of the invention.

The foregoing and/or other aspects are achieved by providing a communication method of a universal plug and play (UPnP) remote access client (RAC) providing remote access service, the communication method including receiving external inputs of an identifier of a UPnP remote access server (RAS) to generate a credential and a session initiation protocol (SIP) identifier of the RAS; generating a payload of a first SIP packet, which is described in extensible markup language (XML) format and includes a credential identifier (ID) generated based on the identifier of the RAS and remote access transport agent (RATA) capability information; and transmitting the first SIP packet to the RAS identified by the SIP identifier, where the payload of the first SIP packet includes multipurpose internet mail extensions (MIME)-type information such that the payload is identified as information used to provide remote access service.

The communication method may further include receiving a second SIP packet including a RATA profile, which is for remote access and is described in XML format in the form of a payload of the second SIP packet, from the RAS; and extracting the payload from the second SIP packet which includes the RATA profile for remote access.

The payload of the SIP packet may be a multipart-payload including a first payload part containing information for establishing a SIP session between the RAS and the RAC; and a second payload part containing the credential ID and the RATA capability information of the RAC.

The second payload part is described in encrypted XML and may include security service for MIME (S-MIME)-type information such that the second payload part is identified as information used to provide encrypted remote access.

The first payload part may be described in session description protocol (SDP) format, and the second payload part may be described in XML format.

Multipart-content type information, which is to identify that the SIP packet includes the multipart-payload, may be included within a header of the SIP packet.

The SIP packet may be either a SIP invite packet or a SIP options packet.

The foregoing and/or other aspects are achieved by providing a communication method of a UPnP RAS providing remote access service, the communication method including receiving a SIP packet, which includes a credential ID and RATA capability information in the form of a payload of the SIP packet, from the RAC, the payload being described in XML format; extracting the payload from the SIP packet; transmitting the credential ID and the RATA capability information to a management console which has subscribed to receive events in advance, where the payload of the SIP packet includes MIME-type information such that the payload is identified as information used to provide remote access service.

The communication method may further include receiving RATA profiles with regard to the RAC and the RAS from the management console; generating a payload of a SIP packet, which is described in XML format and includes RATA profile with regard to the RAC; and transmitting the SIP packet to the RAC.

The payload of the SIP packet may be a multipart-payload including a first payload part containing information used to establish a SIP session between the RAS and the RAC, and a second payload part containing the RATA profile with regard to the RAC.

The second payload part may be described in encrypted XML and include S-MIME type information such that the second payload part is identified as encrypted information used to provide remote access.

The first payload part may be described in SDP (session description protocol) format, and the second payload part may be described in XML format.

Multipart-content type information, which is used to identify that the SIP packet includes the multipart-payload, may be included within a header of the SIP packet.

The SIP packet may be either a SIP invite packet or a SIP options packet.

The foregoing and/or other aspects are achieved by providing a computer readable recording medium having recorded thereon a computer program to cause a computer to execute the method above.

The foregoing and/or other aspects are achieved by providing a UPnP RAC to provide remote access service, the UPnP RAC including a user interface unit receiving external inputs of an identifier of a UPnP RAS to generate a credential and a SIP identifier of the RAS; a SIP payload generating unit generating a payload of a SIP packet, which is described in XML and includes a credential ID generated based on the identifier of the RAS and RATA capability information; and a SIP packet transmitting unit transmitting the SIP packet to the RAS identified by the SIP identifier, where the payload of the SIP packet includes MIME-type information such that the payload is identified as information used to provide remote access service.

The foregoing and/or other aspects are achieved by providing a UPnP RAS to provide remote access service, the UPnP RAS including a SIP packet receiving unit receiving a SIP packet, which includes a credential ID described in XML format and RATA capability information in the form of a payload of the SIP packet, from a UPnP RAC; a SIP payload extracting unit extracting the payload from the SIP packet; and a management console transmitting interface transmitting the credential ID and the RATA capability information to a management console subscribed to receive events in advance, where the payload of the SIP packet includes MIME-type information such that the payload is identified as information used to provide remote access service.

BRIEF DESCRIPTION OF THE DRAWINGS

The above and other features and advantages will become more apparent by describing in detail embodiments thereof with reference to the attached drawings in which:

FIG. 2A is a diagram showing a process of transmitting a RATA profile, which uses a SIP protocol, and a RATA profile description format, which uses a session description protocol (SDP), according to an embodiment;

FIG. 2B is a diagram showing a RATA profile description format using extensive markup language (XML), according to another embodiment;

FIG. 2C is a diagram showing a SIP invite packet including a RATA profile described in XML format, according to another embodiment;

FIG. 2E is a diagram showing a SIP invite packet including a RATA profile described in encrypted XML, according to another embodiment;

FIG. 3 is a diagram showing a process in which a RAC of a remote network and a RAS of a home network, according to another embodiment, set up RATA profiles by using a separate management console;

DETAILED DESCRIPTION OF EMBODIMENTS

Figure 1:
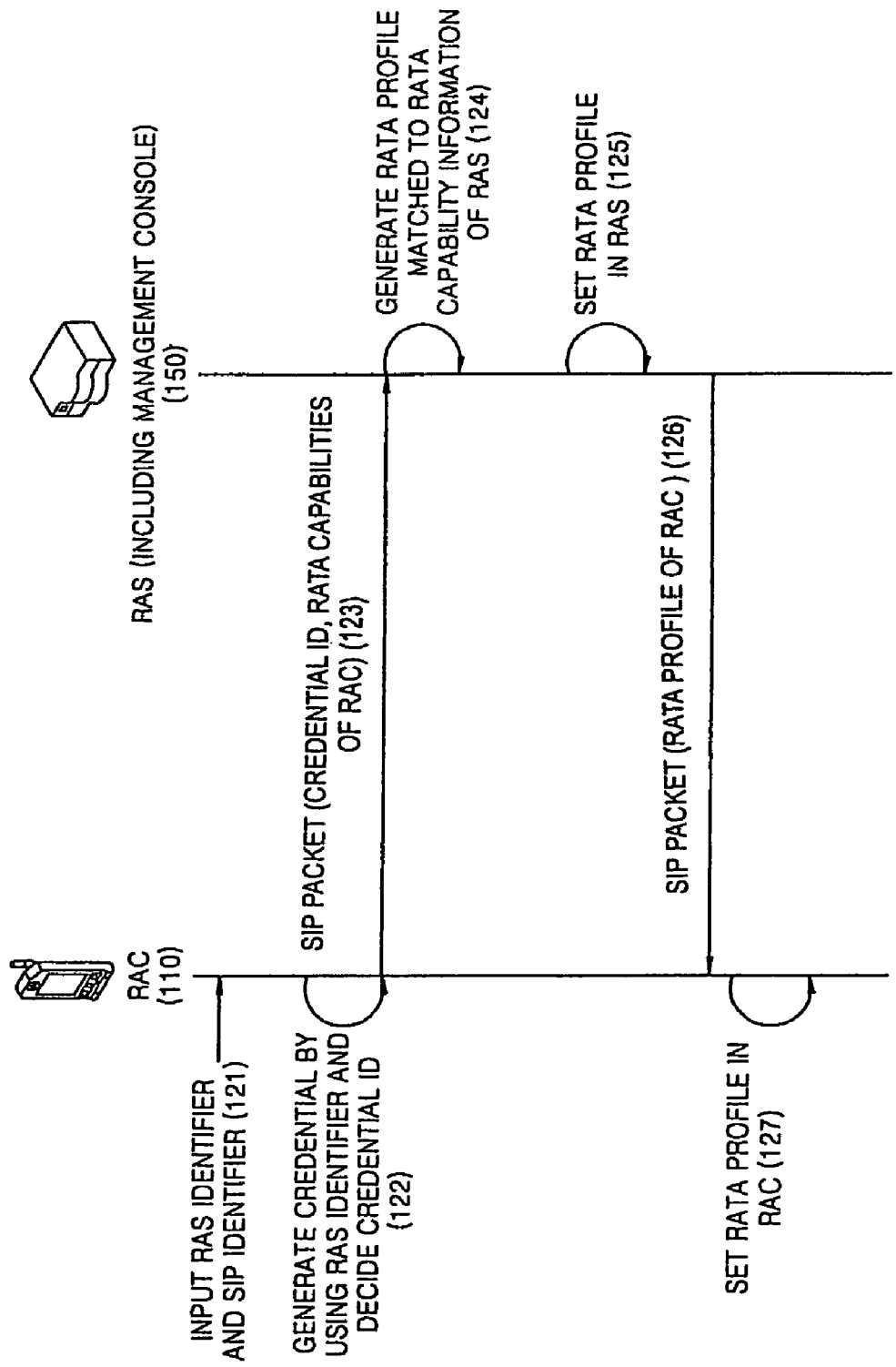
FIG. 1 is a diagram showing a process in which a remote access server (RAS) of a home network, which includes a management console in a remote server, and a remote access client (RAC) of a remote network set remote access transport agent (RATA) profiles, according to an embodiment.

The present invention will now be described more fully with reference to the accompanying drawings, in which embodiments of the invention are shown. Like reference numerals in the drawings denote like elements. In the drawings, the thicknesses of layers and regions may be exaggerated for clarity.

FIG. 1 is a diagram showing a process in which a remote access server (RAS) 150 of a home network, which includes a management console in a remote server, and a remote access client (RAC) 110 of a remote network set remote access transport agent (RATA) profiles, according to an embodiment.

The RAS 150 is a UPnP device existing within a home network, whereas the RAC 110 is a UPnP device existing within a remote network. The RAS 150 is a logic device supporting remote access service, and may be either a device physically identical to an internet gateway device (IGD) or a device separate from the IGD. The management console is a device to set configuration information related to remote access and controlling remote access service. In other words, the management console is a UPnP control point (CP) to control remote access service. The management console according to the current embodiment is included in the RAS 150. According to the current embodiment, new UPnP actions and state variables may be defined in the RAS 150, the RAC 110, and the management console.

The RAS 150 and the RAC 110 synchronize device list information, discovered in networks of each, via a remote access transport channel (RATC) therebetween. Thus, the RAC 110 in the remote network can discover UPnP devices within the home network. Then, the RAS 150 in the home network forwards a message to control a device, received by the RAC 110 in the remote network via the RATC, to a UPnP device corresponding to the message.

The management console provides parameters, which are required to set the RATC between the RAS 150 and the RAC 110, in the form of RATA profiles. The management console matches information regarding protocols to be used by the RATAs of the RAS 150 and the RAC 110 and capability information, and generates RATA profiles for each of the RAS 150 and RAC 110 based on the matched information. The RAS 150 and the RAC 110 sets the RATA profiles within themselves, so that the RATC can be set up between the RAS 150 and the RAC 110 later. If the RAS 150 and the RAC 110 exist in the same network, the RATA profile may be dynamically set up according to the UPnP Device Architecture 1.0.

Meanwhile, if the RAS 150 or the RAC 110 is in a private network that is network address translation (NAT) based, each of the devices provides a NAT passing address to a remote device in order to be accessed by the remote device. Here, a TA set is a set of addresses which can be candidates for an address to pass the NAT.

The addresses in the TA set are pairs of <IP address>:<Port Number>. In the current embodiment, three types of TA, including a TA, a reflexive TA, and a relaying TA, are used. A TA set is a group of independent TAs.

A TA is a pair of an IP address allocated to a UPnP device and a port number of a service to access. A reflexive TA is, when the RAS or the RAC is in a NAT-based private network, a pair of a public IP address allocated to the network and a port number allocated to either a terminal or a service to access. A reflexive TA can be obtained from a response to an inquiry to a simple traversal of the User Datagram Protocol (UDP) through NATs (STUN) server. A relaying TA is, when the RAS or the RAC is in a NAT-based private network and packets destined for the private network are relayed by a traversal using relays around the NAT (TURN) server, a pair of public IP addresses allocated to the TURN server and a port number of a service to access. Since a method forming a TA set in each device is defined in standard specification of the STUN and the TURN, detailed descriptions thereof will not be provided here.

More particularly, FIG. 1 shows a process in which a RAC without the RATA profile of the remote network sets a RATA profile by the RAS of the home network.

In operation 121, an identifier of a RAS to generate a credential and a Session Initiation Protocol (SIP) identifier (i.e., an e-mail ID) are externally input to the RAC 110. The identifier of a RAS to generate a credential may be a product identification number (PIN), which is given to the RAS when the RAS is manufactured, or an externally input password.

In operation 122, the RAC 110 generates a credential and a credential ID by using an identifier of the RAS. The management console requires RATA capability information of the RAC 110 and a credential ID to generate a RATA profile. Thus, the RAC 110 generates a credential by using the identifier of the RAS received in operation 121 and determines a credential ID with respect to the generated credential.

In operation 123, the RAC 110 generates a SIP packet including the credential ID and RATA capability information, and transmits the SIP packet to the RAS 150.

In operation 124, the management console included in the RAS 150 receives the credential ID of the RAC 110 and the RATA capability information. The management console matches protocols to be used by RATAs of the RAS 150 and the RAC 110 and capability information, and generates RATA profiles for the RAS 150 and the RAC 110 based on the matched information.

In operation 125, the RAS 150 sets a RATA profile within the RAS 150.

In operation 126, the RAC 110 receives a SIP packet, which includes the RATA profile generated with regard to the RAC 110 in operation 124, from the RAS 150.

In operation 127, the RAC 110 sets the RATA profile within the RAC 110. Then, a RATC is set up between the RAS 150 and the RAC 110 by using the RATA profile.

According to an embodiment, a RATA profile can be dynamically provided to a RAC in a remote network, where a RATA profile with regard to the remote access to RAS is not set in advance in a home network where a RAS including a management console exists. Here, the RAC only requires external inputs of an identifier of the RAS (i.e., PIN information) and a SIP identifier. Thus, a remote access channel can be set up easily.

Meanwhile, according to another embodiment, when a RAC without a RATA profile exists in a remote network, the RAC may receive the RATA profile and a TA set from a RAS of a home network including a management console and set the RATA profile and the TA set. The RAC may also dynamically receive a TA set of the RAS from a predetermined server operated by a network service provider. Detailed operations will be described below.

An identifier of the RAS to generate a credential and a SIP identifier are externally input to the RAC. The identifier of the RAS to generate a credential may be a product identification number (PIN), which is given to the RAS when the RAS is manufactured, or may be an externally input password.

The RAC generates a credential and a credential ID by using the identifier of the RAS. The management console requires RATA capability information and a credential ID of the RAC to generate a RATA profile. Thus, the RAC generates a credential by using the identifier of the RAS and determines a credential ID with respect to the generated credential.

The RAC generates a SIP packet, which includes the credential ID, the RATA capability information, and a TA set of the RAC, and transmits the SIP packet to the RAS.

The management console of the RAS receives the credential ID and the RATA capability information of the RAC. The management console matches protocols and capability information that are to be used by the RATAs of the RAS and the RAC, and generates RATA profiles with regard to the RAS and the RAC based on the matched information.

The RAS sets up its RATA profile and a TA set of the RAC within the RAS. The RAC may also dynamically receive a TA set of the RAS from a predetermined server operated by the network service provider. The TA set of the RAC is used to set up a remote access to the RAC.

The RAC receives a SIP packet, which includes the RATA profile of the RAC and a TA set of the RAS, from the RAS.

The RAC sets up the RATA profile and the TA set of the RAS within the RAC. The RAC may also dynamically receive a TA set of the RAS from a predetermined server operated by the network service provider. Then, the RAC establishes a RATC between the RAS and the RAC by using the RATA profile and the TA set of the RAS. A combination of TAs to be used between the RAC and the RAS is selected according to a predetermined priority. If communication between the RAC and the RAS using a selected combination of TAs fails, a combination of TAs of next priority is selected.

According to another embodiment, a RATA profile can be dynamically provided to a RAC of a remote network, where a RATA profile with regard to the remote access is not set in advance in a home network, where a RAS and a management console exist. Here, the RAC only requires external inputs of an identifier of the RAS (i.e., PIN information) and a SIP identifier. Thus, remote access channel setup can be performed easily.

Furthermore, according to another embodiment, even if a RAS or a RAC is in a NAT-based private network, remote access service can still be provided by providing a NAT passing address to a remote device in the form of a TA set.

FIG. 2A is a diagram showing a process of transmitting a RATA profile, which uses a SIP protocol, and a RATA profile description format, which uses a session description protocol (SDP), according to an embodiment.

In operation 211, a RAC 220 describes a credential ID and RATA capability information 213 by using SDP, and transmits them to a RAS 225 in the form of a SIP invite packet. Referring to FIG. 2A, fields of each of the credential ID and the RATA capability information are encoded in the SDP format.

Furthermore, according to another embodiment (not shown), the RAC 220 can also transmit its NAT passing address as a TA set to the RAS 225 by using the SDP format or the XML format.

In operation 212, the RAC 220 receives a RATA profile regarding the RAC 220, where the RATA profile is generated as a result of a matching operation performed by a management console included in the RAS 225. As shown in FIG. 2A, each of a plurality of fields of the RATA profile 214 is encoded in the SDP format.

Furthermore, according to another embodiment (not shown), the RAS 225 can also transmit its NAT passing address as a TA set to the RAC 220 by using the SDP format or the XML format.

FIG. 2B is a diagram showing a RATA profile description format using XML, according to another embodiment.

The RAC 220 describes a credential ID and RATA capability information using XML, and transmits them to the RAS 225 in the form of a SIP invite packet 230. Fields of each of the credential ID and the RATA capability information are encoded in the XML format.

In this case, a payload 234 of the SIP invite packet 230 may be generated as a multipart-payload. The multipart-payload includes a first payload part 235, which contains information to establish a SIP session between the RAS 225 and the RAC 220, and a second payload part 237, which contains a credential ID and RATA capability information of the RAC 220. To identify that the SIP invite packet 230 includes a multipart-payload, the SIP invite packet 230 includes a value "multipart/mixed" for a "Content-Type" field 233 within a header field 231 of the SIP invite packet 230. Although the value "multipart/mixed" value is used as the value for the "Content-Type" field 233 in the current embodiment, it is clear to those in the art that a new field value can be defined and used. The header field 231 also includes an "Accept" field 232, which has an "application/rata-provision-para+xml" MIME type value.

The first payload part 235, which contains information to establish a SIP session between the RAS 225 and the RAC 220, may be described in the SDP format. A "Content-Type" field 236 within the first payload part 235 has an "application/sdp" multipurpose internet mail extensions (MIME) type value, such that the first payload part 235 is identified as information to set up a SIP session.

The second payload part 237, which contains a credential ID and RATA capability information of the RAC 220, may be described in the form of XML as described above, and a "Content-Type" field 238 within the second payload part 237 has an "application/rata-provision-para+xml" MIME type value, such that the second payload part 237 is identified as information to provide a remote access service. Although the value "application/rata-provision-para+xml" MIME type value is used in the current embodiment, it is clear to those in the art that a new MIME type value can be defined and used.

Then, the RAC 220 receives a RATA profile regarding the RAC 220 from the RAS 225, where the RATA profile is generated as a result of a matching operation performed by the management console included in the RAS 225. The RATA profile is described in XML format, and is included in a payload of a SIP response packet 230.

In this case, a payload 234 of the SIP response packet may be generated as a multipart-payload. The multipart-payload includes the first payload part 235, which contains information to establish a SIP session between the RAS 225 and the RAC 220, and the second payload part 237, which contains a RATA profile regarding the RAC 220. To identify that the SIP response packet includes a multipart-payload, the SIP response packet includes a value "multipart/mixed" for the "Content-Type" field 233 within the header of the SIP response packet. Although the value "multipart/mixed" value is used as the value for the "Content-Type" field in the current embodiment, it is clear to those in the art that a new field value can be defined and used.

The first payload part 235, which contains information to establish a SIP session between the RAS 225 and the RAC 220, may be described in the SDP format. The "Content-Type" field 236 within the first payload part 235 has an "application/sdp" MIME type value, such that the first payload part 235 is identified as information to set up a SIP session.

The second payload part 237, which contains a RATA profile regarding the RAC 220, may be described in the form of XML as described above, and the "Content-Type" field 238 within the second payload part 237 has an "application/rata-provision-para+xml" MIME type value, such that the second payload part 237 is identified as information to provide a remote access service. Although the value "application/rata-provision-para+xml" MIME type value is used in the current embodiment, it is clear to those in the art that a new MIME type value can be defined and used.

FIG. 2C is a diagram showing a SIP invite packet including a RATA profile described in XML format, according to another embodiment.

A SIP invite packet includes an "Accept" field 242 and a "Content-Type" field 243 within the header of the SIP invite packet. The "Accept" field 242 has an "application/rata-provision-para+xml" value, and the value indicates that the RAC 220 can receive information to provide a remote access service, the information being described in XML format from the RAS 225, and can interpret the information. The "Content-Type" field 243 has a "multipart/mixed" value, and the value indicates that the SIP invite packet includes a multipart-payload.

A "boundary" field defines an identifier to identify the boundary between each of payloads. The "Content-Type" field 244 within the first payload part 235 has an "application/sdp" value, and the value indicates that the first payload part 235 contains information to establish a SIP session between the RAS 225 and the RAC 220. The "Content-Type" field 245 within the second payload part 237 has an "application/rata-provision-para+xml" value, and the value indicates that the second payload part 237 contains information to provide a remote access service.

Figure 2D:
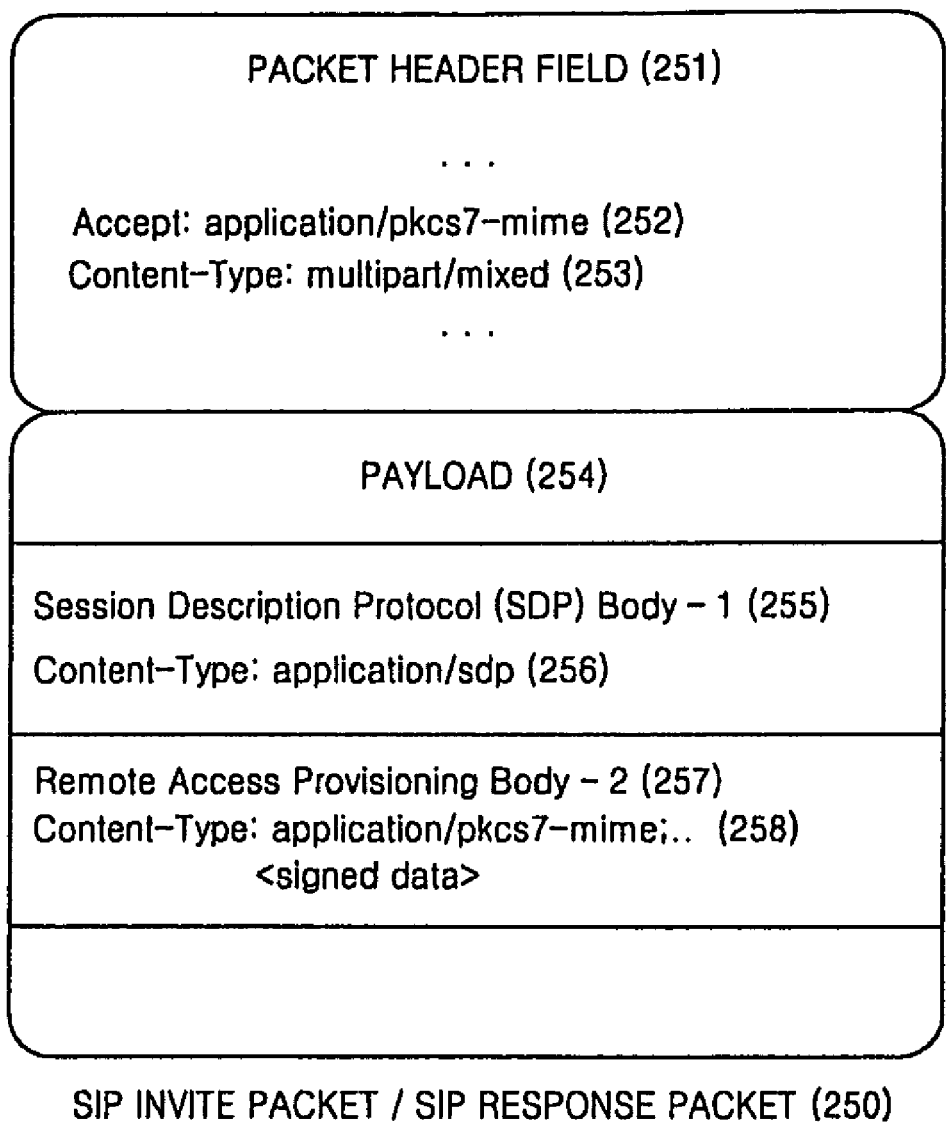
FIG. 2D is a diagram showing a RATA profile description format using an encrypted XML, according to another embodiment.

FIG. 2D is a diagram showing a format of RATA profile description format using an encrypted XML, according to another embodiment.

The RAC 220 describes a credential ID and RATA capability information using XML, and transmits them to the RAS 225 in the form of a SIP invite packet 250. Fields of each of the credential ID and the RATA capability information are encoded in encrypted XML format.

In this case, a payload 254 of the SIP invite packet 250 may be generated as a multipart-payload. The multipart-payload includes a first payload part 255, which contains information to establish a SIP session between the RAS 225 and the RAC 220, and a second payload part 257, which contains a credential ID and RATA capability information of the RAC 220. To identify that the SIP invite packet 250 includes a multipart-payload, the SIP invite packet includes a value "multipart/mixed" for a "Content-Type" field 253 within the header field 251 of the SIP invite packet 250. Although the value "multipart/mixed" value is used as the value for the "Content-Type" field 253 in the current embodiment, it is clear to those in the art that a new field value can be defined and used. The header field 251 also includes an "Accept" field 252, which has an "application/pcks7-mime" S-MIME type value.

The first payload part 255, which contains information to establish a SIP session between the RAS 225 and the RAC 220, may be described in the SDP format. A "Content-Type" field 256 within the first payload part 255 has an "application/sdp" MIME type value, such that the first payload part 255 is identified as information to set up a SIP session.

The second payload part 257, which contains a credential ID and RATA capability information of the RAC 220, may be described in the form of encrypted XML as described above, and a "Content-Type" field 258 within the second payload part 257 has an "application/pcks7-mime" security services for MIME (S-MIME) type value, such that the second payload part 257 is identified as encrypted information to provide a remote access service. Although the value "application/pcks7-mime" S-MIME type value is used in the current embodiment, it is clear to those in the art that a new S-MIME type value can be defined and used.

Then, the RAC 220 receives a RATA profile regarding the RAC 220 from the RAS 225, where the RATA profile is generated as a result of a matching operation performed by the management console included in the RAS 225. The RATA profile is described in encrypted XML, and is included in a payload of a SIP response packet 250.

In this case, a payload of the SIP response packet may be generated as a multipart-payload. The multipart-payload includes the first payload part 255, which contains information to establish a SIP session between the RAS 225 and the RAC 220, and the second payload part 257, which contains a RATA profile regarding the RAC 220. To identify that the SIP response packet includes a multipart-payload, the SIP response packet includes a value "multipart/mixed" for the "Content-Type" field 253 within the header 251 of the SIP response packet. Although the value "multipart/mixed" value is used as the value for the "Content-Type" field in the current embodiment, it is clear to those in the art that a new field value can be defined and used.

The first payload part 255, which contains information to establish a SIP session between the RAS 225 and the RAC 220, may be described in the SDP format. The "Content-Type" field 256 within the first payload part 255 has an "application/sdp" MIME type value, such that the first payload part 255 is identified as information to set up a SIP session.

The second payload part 257, which contains a RATA profile regarding the RAC 220, may be described in the form of XML as described above, and the "Content-Type" field 258 within the second payload part 257 has an "application/pkcs7-mime" S-MIME type value, such that the second payload part 257 is identified as information to provide a remote access service. Although the value "application/pkcs7-mime" S-MIME type value is used in the current embodiment, it is clear to those in the art that a new S-MIME type value can be defined and used.

FIG. 2E is a diagram showing a SIP invite packet including a RATA profile described in encrypted XML, according to another embodiment.

A SIP invite packet includes an "Accept" field 262 and a "Content-Type" field 263 within the header of the SIP invite packet. The "Accept" field 262 has an "application/pkcs7-mime" value, and the value indicates that the RAC 220 can receive information to provide a remote access service, the information being described in encrypted XML from the RAS 225, and can decrypt the information. The "Content-Type" field 263 has a "multipart/mixed" value, and the value indicates that the SIP invite packet includes a multipart-payload.

A "boundary" field defines an identifier to identify the boundary between each of payloads. The "Content-Type" field 264 within the first payload part 255 has an "application/sdp" value, and the value indicates that the first payload part 255 contains information to establish a SIP session between the RAS 225 and the RAC 220. The "Content-Type" field 265 within the second payload part 257 has an "application/pkcs7-mime" value, and the value indicates that the second payload part 257 contains information to provide an encrypted remote access service. The second payload part 257 may include data, such as s-mime enveloped data 266.

Meanwhile, according to another embodiment, a RATA profile can be described in the form of a payload of a SIP options packet.

When a SIP session is already established between the RAC 220 and the RAS 225 by using a SIP invite packet, information to provide remote access service may be included in a payload of a SIP options packet. Since the SIP session is already established between the RAC 220 and the RAS 225, it is not necessary for the SIP options packet to include a payload part containing information to establish a SIP session.

The RAC 220 describes a credential ID and RATA capability information using XML, and transmits them to the RAS 225 in the form of a SIP options packet. Fields of each of the credential ID and the RATA capability information are encoded in XML format.

In this case, a payload of the SIP invite packet may be generated as a single-payload. The single-payload including the credential ID and the RATA capability information of the RAC 220 may be described in the form of XML as described above, and a "Content-Type" field within the single-payload has an "application/rata-provision-para+xml" MIME type value, such that the single payload is identified as information to provide a remote access service. Although the value "application/rata-provision-para+xml" MIME type value is used in the current embodiment, it is clear to those in the art that a new MIME type value can be defined and used.

According to another embodiment, a "Content-Type" field within the single payload has an "application/pkcs7-mime" S-MIME type value, such that the second payload part 257 is identified as encrypted information to provide a remote access service. Although the value "application/pkcs7-mime" S-MIME type value is used in the current embodiment, it is clear to those in the art that a new S-MIME type value can be defined and used.

Then, the RAC 220 receives a RATA profile regarding the RAC 220 from the RAS 225, where the RATA profile is generated as a result of a matching operation performed by the management console included in the RAS 225. The RATA profile is described in XML format, and is included in a payload of a SIP options packet.

In this case, a payload of the SIP options packet may be generated as a single-payload. The single-payload including a RATA profile regarding the RAC 220 may be described in the form of XML as described above, and a "Content-Type" field within the single-payload has an "application/rata-provision-para+xml" MIME type value, such that the single payload is identified as information to provide a remote access service. Although the value "application/rata-provision-para+xml" MIME type value is used in the current embodiment, it is clear to those in the art that a new MIME type value can be defined and used.

According to another embodiment, a "Content-Type" field within the single payload has an "application/pkcs7-mime" S-MIME type value, such that the single payload is identified as encrypted information to provide a remote access service.

Although the value "application/pkcs7-mime" S-MIME type value is used in the current embodiment, it is clear to those in the art that a new S-MIME type value can be defined and used.

FIG. 3 is a diagram showing a process in which a RAC 310 of a remote network and a RAS 340 of a home network, according to another embodiment, set up RATA profiles by using a separate management console 360.

In operation 311, an identifier of the RAS 340 to generate a credential and a SIP identifier are externally input to the RAC 310. The identifier of the RAS 340 to generate a credential may be a product identification number (PIN), which is given to the RAS 340 when the RAS 340 is manufactured, or an externally input password.

In operation 312, the RAC 310 generates a credential and a credential ID by using the identifier of the RAS 340. The management console 360 requires RATA capability information and a credential ID of the RAC 310 to generate a RATA profile. Thus, the RAC 310 generates a credential by using the identifier of the RAS 340, which is received in operation 311, and determines a credential ID with respect to the generated credential.

In operation 313, the RAC 310 generates a SIP packet, which includes the credential ID and the RATA capability information, and transmits the SIP packet to the RAS 340.

In operation 314, the management console 360 receives an event message from the RAS 340, to which the management console 360 has subscribed to receive an event (operation 361), the event message indicating that the RAS 340 has received the credential ID and the RATA capability information of the RAC 310.

In operations 315 and 316, the management console 360 receives the credential ID and the RATA capability information of the RAC 310 via a UPnP action.

In operation 317, the management console 360 matches protocols and capability information that are to be used by the RATAs of the RAS 340 and the RAC 310 and generates RATA profiles with regard to the RAS 340 and the RAC 310.

In operation 318, the management console 360 transmits the generated RATA profiles to the RAS 340 via a UPnP action.

In operation 319, the RAS 340 sets up its RATA profile within the RAS 340.

In operation 320, the RAC 310 receives a SIP packet, which includes the RATA profile of the RAC 310, from the RAS 340.

In operation 321, the RAC 310 sets up the RATA profile within the RAC 310. Then, the RAC 310 establishes a RATC between the RAS 340 and the RAC 310 by using the RATA profile.

According to another embodiment, a RATA profile can be dynamically provided to a RAC of a remote network, where a RATA profile with regard to the remote access is not set up in advance in a home network and where a RAS and a management console exist. Here, the RAC only requires external inputs of an identifier of the RAS (i.e., PIN information) and a SIP identifier. Thus, remote access channel setup can be performed easily.

Meanwhile, according to another embodiment, a RAC of a remote network and a RAS of a home network may set up RATA profiles and TA sets by using a separate management console.

An identifier of the RAS used to generate a credential and a SIP identifier are externally input to the RAC. The identifier of the RAS used to generate a credential may be a PIN, which is given to the RAS when the RAS is manufactured, or an externally input password.

The RAC generates a credential and a credential ID by using an identifier of the RAS. The management console requires RATA capability information of the RAC and a credential ID to generate a RATA profile. Thus, the RAC generates a credential by using the received identifier of the RAS and determines a credential ID with respect to the generated credential.

The RAC generates a SIP packet including the credential ID, RATA capability information, and a TA set of the RAC, and transmits the SIP packet to the RAS.

The management console receives an event message from the RAS, to which the management console has subscribed to receive an event in advance, where the event message indicates that the RAS has received the credential ID and the RATA capability information of the RAC.

The management console receives the credential ID and the RATA capability information of the RAC via a UPnP action.

The management console matches protocols and capability information that are to be used by the RATAs of the RAS and the RAC and generates RATA profiles with regard to the RAS and the RAC.

The management console transmits the generated RATA profiles to the RAS via a UPnP action.

The RAS sets up its RATA profile and the TA set of the RAC within the RAS.

The RAC receives a SIP packet, which includes the RATA profile of the RAC and a TA set of the RAS, from the RAS.

The RAC sets up the RATA profile and the TA set within the RAC. Then, the RAC establishes a RATC between the RAS and the RAC by using the RATA profile and the TA set.

According to another embodiment, a RATA profile can be dynamically provided to a RAC of a remote network, where a RATA profile with regard to the remote access is not set up in advance in a home network and where a RAS and a management console exist. Here, the RAC only requires external inputs of an identifier of the RAS (i.e., PIN information) and a SIP identifier. Thus, remote access channel setup can be performed easily.

Furthermore, according to the current embodiment, even if a RAS or a RAC is within a NAT-based private network, remote access service can be provided by providing a NAT passing address in the form of a TA set to a remote device.

Figure 4:
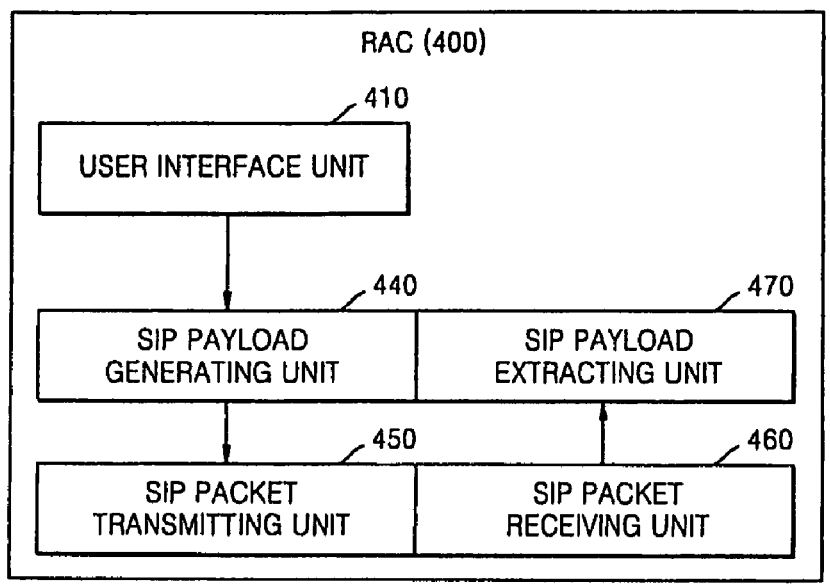
FIG. 4 is a block diagram illustrating the structure of a RAC according to an embodiment.

FIG. 4 is a block diagram illustrating the structure of a RAC 400 according to an embodiment. Referring to FIG. 4, the RAC 400 according to the present embodiment includes a user interface unit 410, a SIP payload generating unit 440, a SIP packet transmitting unit 450, a SIP packet receiving unit 460, and a SIP payload extracting unit 470.

The user interface unit 410 receives external inputs of an identifier (i.e., PIN information) of a RAS and a SIP identifier (i.e., an e-mail ID) of the RAS to generate a credential.

A RATA credential managing unit (not shown) generates a credential by using the identifier of the RAS and decides a credential ID with respect to the generated credential.

The SIP payload generating unit 440 generates a payload of a SIP packet, which includes a credential ID and RATA capability information.

The SIP packet transmitting unit 450 transmits the SIP packet to the RAS.

The SIP packet receiving unit 460 receives a SIP packet for remote access, the SIP packet including a RATA profile.

The SIP payload extracting unit 470 extracts the payload, which includes the RATA profile for remote access, from the SIP packet.

A RATA profile configuring unit (not shown) sets the RATA profile, which is for remote access, within the RAC

400. Next, the RAC 400 establishes a RATC between the RAC 400 and the RAS by using the RATA profile.

Meanwhile, a RAC according to another embodiment includes a user interface unit, a RATA credential managing unit, a RAC TA managing unit, a SIP payload generating unit, a SIP packet transmitting unit, a SIP packet receiving unit, a SIP payload extracting unit, a RATA profile configuring unit, and a RAS TA configuring unit.

The user interface unit receives external inputs of an identifier (i.e., PIN information) of a RAS and a SIP identifier (i.e., an e-mail ID) of the RAS to generate a credential.

The RATA credential managing unit generates a credential by using the identifier of the RAS and decides a credential ID with respect to the generated credential.

The RAC TA managing unit generates a TA set corresponding to candidate IP addresses to access the RAC.

The SIP payload generating unit generates a payload of a SIP packet, which includes a credential ID, RATA capability information, and the TA set of the RAC.

The SIP packet transmitting unit transmits the SIP packet to the RAS.

The SIP packet receiving unit receives a SIP packet for remote access, the SIP packet including a RATA profile and a TA set of the RAS.

The SIP payload extracting unit extracts the payload, which includes the RATA profile and the TA set of the RAS for remote access, from the SIP packet.

The RATA profile configuring unit sets the RATA profile, which is for remote access, within the RAC. The RAS TA configuring unit sets up the TA set of the RAS within the RAC. Next, the RAC establishes a RATC between the RAC and the RAS by using the RATA profile and the TA set of the RAS.

Figure 5:
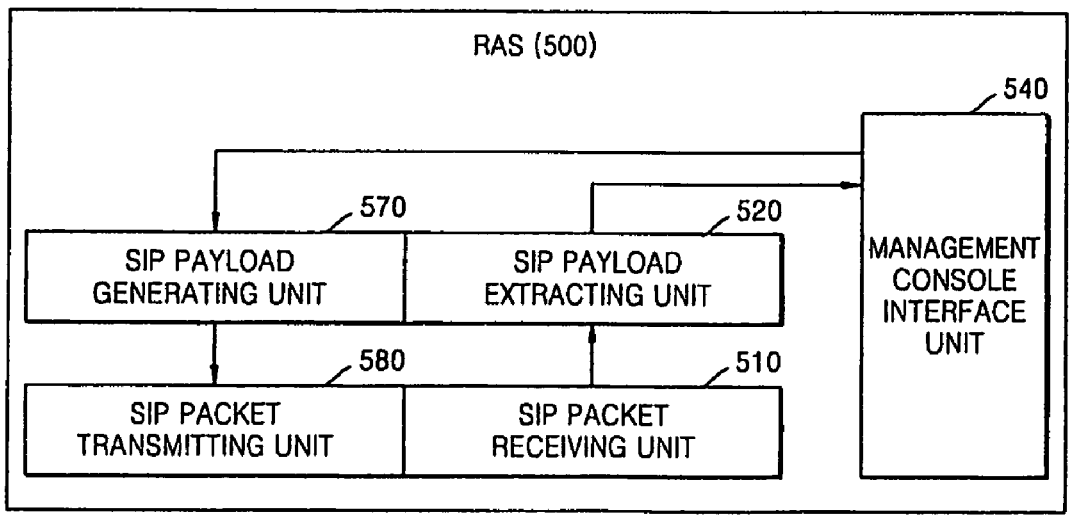
FIG. 5 is a block diagram illustrating the structure of a RAS according to an embodiment.

FIG. 5 is a block diagram illustrating the structure of a RAS 500 according to an embodiment. Referring to FIG. 5, the RAS 500 according to the present embodiment includes a SIP packet receiving unit 510, a SIP payload extracting unit 520, a management console interface unit 540, a SIP payload generating unit 570, and a SIP packet transmitting unit 580.

The SIP packet receiving unit 510 receives a SIP packet, which includes a credential ID and RATA capability information, from the RAC. The SIP payload extracting unit 520 extracts a payload, which includes the credential ID and the RATA capability information, from the SIP packet.

The management console interface unit 540 includes a management console transmitting interface unit (not shown), which transmits the credential ID and the RATA capability information to a management console subscribed to receive an event in advance, and includes a management console receiving interface unit (not shown), which receives RATA profiles regarding the RAC and the RAS 500 from the management console.

A RATA profile configuring unit (not shown) sets the RATA profile regarding the RAS within the RAS.

The SIP payload generating unit 570 generates a payload of a SIP packet, which includes the RATA profile regarding the RAC. The SIP packet transmitting unit 580 transmits the SIP packet to the RAC.

Meanwhile, a RAS according to another embodiment includes a SIP packet receiving unit, a SIP payload extracting unit, a RAC TA configuring unit, a management console interface unit, a RATA profile configuring unit, a RAS TA managing unit, a SIP payload generating unit, and a SIP packet transmitting unit.

The SIP packet receiving unit receives a SIP packet, which includes a credential ID, RATA capability information, and a TA set of the RAC, from the RAC. The SIP payload extracting unit extracts a payload, which includes the credential ID, the RATA capability information, and the TA set of the RAC, from the SIP packet.

The RAC TA configuring unit sets the TA set of the RAC within the RAS.

The management console interface unit includes a management console transmitting interface unit (not shown), which transmits the credential ID and the RATA capability information to a management console subscribed to receive an event in advance, and a management console receiving interface unit (not shown), which receives RATA profiles regarding the RAC and the RAS from the management console.

The RATA profile configuring unit sets the RATA profile regarding the RAS within the RAS.

The RAS TA managing unit generates a TA set corresponding to candidate IP addresses to access the RAS.

The SIP payload generating unit generates a payload of a SIP packet, which includes the RATA profile regarding the RAC and the TA set of the RAS.

The SIP packet transmitting unit 580 transmits the SIP packet to the RAC.

Figure 6:
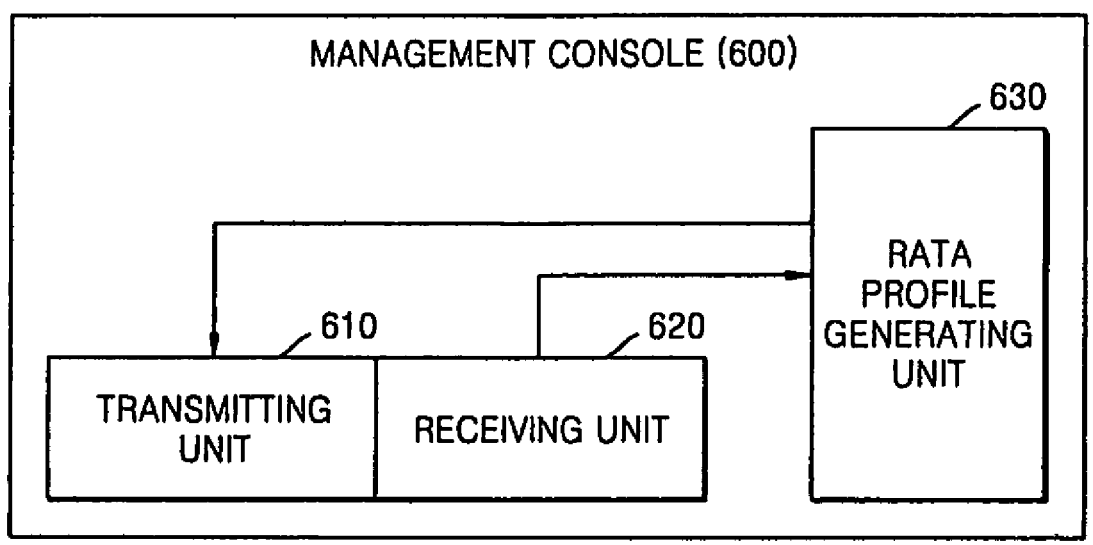
FIG. 6 is a block diagram illustrating the structure of a management console according to an embodiment.

FIG. 6 is a block diagram illustrating the structure of a management console 600 according to an embodiment of the present invention.

Referring to FIG. 6, the management console 600 according to the present embodiment includes a transmitting unit 610, a receiving unit 620, and a RATA profile generating unit 630. The receiving unit 620 receives a credential ID and RATA capability information of a RAC from a RAS to which the management console 600 subscribes to receive events in advance. The RATA profile generating unit 630 generates RATA profiles with regard to the RAC and the RAS. The transmitting unit 610 transmits the RATA profiles to the RAS. The management console 600 may be either a physically separate device or an internal unit within the RAS.

The embodiments can be written as computer programs and can be implemented in general-use digital computers that execute the programs using a computer readable medium. Examples of the computer readable medium include recording media, such as magnetic storage media (e.g., ROM, floppy disks, hard disks, etc.) and optical recording media (e.g., CD-ROMs, or DVDs), and media such as carrier waves (e.g., transmission through the Internet).

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. A communication method of a universal plug and play (UPnP) remote access client (RAC) providing remote access service, the communication method comprising:
   receiving external inputs of an identifier of a UPnP remote access server (RAS) to generate a credential, and a session initiation protocol (SIP) identifier of the RAS;
   generating a payload of a first SIP packet, which is described in extensible markup language (XML) format, and includes a credential identifier (ID) generated based on the identifier of the RAS and remote access transport agent (RATA) capability information; and
   transmitting the first SIP packet to the RAS identified by the SIP identifier,
   wherein the identifier of the RAS is a product identification number (PIN) allocated to the RAS, and wherein the payload of the first SIP packet includes multipurpose internet mail extensions (MIME)-type information such that the payload is identified as information to provide remote access service.

2. The communication method of claim 1, further comprising:
receiving a second SIP packet including a RATA profile of the RAC generated in the RAS using the credential ID and the RATA capability information and is described in XML format in the form of a payload of the second SIP packet, from the RAS; and
extracting the payload from the second SIP packet including the RATA profile for remote access.

3. The communication method of claim 1, wherein the payload of the first SIP packet is a multipart-payload comprising:
a first payload part containing information used to establish a SIP session between the RAS and the RAC; and
a second payload part containing the credential ID and the RATA capability information of the RAC.

4. The communication method of claim 3, wherein the second payload part is described in encrypted XML and includes security service for MIME-type information such that the second payload part is identified as information used to provide encrypted remote access.

5. The communication method of claim 3, wherein the first payload part is described in session description protocol format, and the second payload part is described in XML format.

6. The communication method of claim 3, wherein multipart-content type information, which is used to identify that the first SIP packet includes the multipart-payload, is included within a header of the first SIP packet.

7. The communication method of claim 1, wherein the first SIP packet is a SIP invite packet or a SIP options packet.

8. A non-transitory computer readable recording medium having recorded thereon a computer program causing a computer to execute the method of claim 1.

9. A communication method of a universal plug and play (UPnP) remote access server (RAS) providing remote access service, the communication method comprising:
receiving a first session initiation protocol (SIP) packet a credential identifier (ID) and remote access transport agent (RATA) capability information in the form of a payload of the first SIP packet, from the remote access client (RAC), the payload being described in extensible markup language (XML) format;
extracting the payload from the first SIP packet;
transmitting the credential ID and the RATA capability information to a management console which has subscribed to receive events in advance,
wherein the credential ID is generated by the RAC using an identifier of the RAS which is a product identification number (PIN) allocated to the RAS, and
wherein the payload of the first SIP packet includes multipurpose internet mail extensions (MIME)-type information such that the payload is identified as information to provide remote access service.

10. The communication method of claim 9, further comprising:
generating RATA profiles for the RAS and the RAC using the credential ID and the RATA capability information for remote access, by the management console;
receiving the RATA profiles of the RAC and the RAS from the management console;
generating a payload of a second SIP packet, which is described in XML format and includes a RATA profile of the RAC; and
transmitting the second SIP packet to the RAC.

11. The communication method of claim 10, wherein the payload of the second SIP packet is a multipart-payload comprising:
a first payload part containing information used to establish a SIP session between the RAS and the RAC; and
a second payload part containing the RATA profile with regard to the RAC.

12. The communication method of claim 11, wherein the second payload part is described in encrypted XML and includes security service for MIME (S-MIME)-type information such that the second payload part is identified as encrypted information used to provide remote access.

13. The communication method of claim 11, wherein the first payload part is described in session description protocol format, and the second payload part is described in XML format.

14. The communication method of claim 11, wherein multipart-content type information, which is used to identify that the SIP packet includes the multipart-payload, is included within a header of the SIP packet.

15. The communication method of claim 9, wherein the first SIP packet is a SIP invite packet or a SIP options packet.

16. A universal plug and play (UPnP) remote access client (RAC) to provide remote access service, the UPnP RAC comprising:
a user interface unit receiving external inputs of an identifier of a UPnP remote access server (RAS) to generate a credential and a session initiation protocol (SIP) identifier of the RAS;
a SIP payload generating unit generating a payload of a first SIP packet, which is described in extensible markup language (XML), and includes a credential identifier (ID) generated based on the identifier of the RAS and remote access transport agent (RATA) capability information; and
a SIP packet transmitting unit transmitting the first SIP packet to the RAS identified by the SIP identifier,
wherein the identifier of the RAS is a product identification number (PIN) allocated to the RAS, and
wherein the payload of the first SIP packet includes multipurpose internet mail extensions (MIME)-type information such that the payload is identified as information used to provide remote access service.

17. The UPnP RAC of claim 16, further comprising:
a SIP packet receiving unit receiving a second SIP packet, which includes a RATA profile of the RAC generated in the RAS using the credential ID and the RATA capability information and described in XML format for remote access, in the form of a payload of the second SIP packet, from the RAS; and
a SIP payload extracting unit extracting the payload from the second SIP packet.

18. The UPnP RAC of claim 16, wherein the payload of the first SIP packet is a multipart-payload comprising:
a first payload part containing information used to establish a SIP session between the RAS and the RAC; and
a second payload part containing the credential ID and the RATA capability information of the RAC.

19. A universal plug and play (UPnP) remote access server (RAS) to provide remote access service, the UPnP RAS comprising:
a session initiation protocol (SIP) packet receiving unit receiving a first SIP packet including a credential identifier (ID) described in extensive markup language (XML) format and remote access transport agent (RATA) capability information in the form of a payload of the first SIP packet from a UPnP remote access client (RAC);
a SIP payload extracting unit extracting the payload from the first SIP packet; and
a management console transmitting interface transmitting the credential ID and the RATA capability information to a management console subscribed to receive events in advance,
wherein the credential ID is generated by the RAC using an identifier of the RAS which is a product identification number (PIN) allocated to the RAS, and
wherein the payload of the first SIP packet includes multipurpose internet mail extensions (MIME)-type information such that the payload is identified as information used to provide remote access service.

20. The UPnP RAS of claim 19, further comprising:
a management console receiving interface receiving RATA profiles of the RAC and the RAS generated by the management console using the credential ID and the RATA capability information, from the management console;
a SIP payload generating unit generating a payload of a second SIP packet, which is described in XML format and includes the RATA profile of the RAC; and
a SIP packet transmitting unit transmitting the second SIP packet to the RAC.

21. The UPnP RAS of claim 20, wherein the payload of the second SIP packet is a multipart-payload comprising:
a first payload part containing information used to establish a SIP session between the RAS and the RAC; and
a second payload part containing the RATA profile of the RAC.

* * * * *